(12) United States Patent
Arai et al.

(10) Patent No.: US 9,168,932 B2
(45) Date of Patent: Oct. 27, 2015

(54) BATTERY CHARGING CONTROL APPARATUS OF A TRAIN

(71) Applicant: KABUSHIKI KAISHA TOSHIBA, Minato-ku, Tokyo (JP)

(72) Inventors: Satoshi Arai, Kanagawa-ken (JP); Manabu Matsuoka, Tokyo (JP); Isao Takahashi, Tokyo (JP); Yuki Tabuchi, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 272 days.

(21) Appl. No.: 13/764,472

(22) Filed: Feb. 11, 2013

(65) Prior Publication Data

US 2013/0317674 A1     Nov. 28, 2013

(30) Foreign Application Priority Data

May 22, 2012    (JP) ................................ 2012-116398

(51) Int. Cl.
     *B61C 17/12*          (2006.01)
     *B60L 15/32*          (2006.01)
     (Continued)

(52) U.S. Cl.
CPC .................. *B61C 17/12* (2013.01); *B60L 1/003* (2013.01); *B60L 7/14* (2013.01); *B60L 11/123* (2013.01); *B60L 11/1861* (2013.01); *B60L 15/32* (2013.01); *B60L 2200/26* (2013.01); *B60L 2210/10* (2013.01); *B60L 2210/40* (2013.01); *B60L 2250/16* (2013.01); *Y02T 10/6217* (2013.01); *Y02T 10/705* (2013.01); *Y02T 10/7005* (2013.01); *Y02T 10/7044* (2013.01);

(Continued)

(58) Field of Classification Search
CPC ... B60L 2200/26; B61H 9/006; B60W 20/106
USPC ........................................................... 701/19
See application file for complete search history.

(56) References Cited

U.S. PATENT DOCUMENTS

2005/0205720 A1*   9/2005   Peltz et al. ................ 246/187 A
2005/0251299 A1*   11/2005   Donnelly et al. ............... 701/19

(Continued)

FOREIGN PATENT DOCUMENTS

| JP | 2011-010482 A | 1/2011 |
| JP | 2011-061880 A | 3/2011 |
| JP | 4685902 B2 | 5/2011 |

OTHER PUBLICATIONS

Mitsuo Shinbo: "Special Feature Article": JR East Technical Review No. 34: East Japan Railway Company: pp. 23-32.

(Continued)

*Primary Examiner* — Thomas G Black
*Assistant Examiner* — Peter D Nolan
(74) *Attorney, Agent, or Firm* — Holtz, Holtz, Goodman & Chick PC

(57) ABSTRACT

A charge control apparatus of a train set having a plurality of trains, wherein the train has a generator, a battery and a motor supplied with power from the generator and the battery, power, generated by one of the generator and the motor, is able to charge to the battery, and a plurality of trains, driven by an operation of the motor, are connected and each battery is mutually independent, comprises an acquiring unit configured to acquiring charge information indicating charge condition of the battery from each train; and a charge amount control unit configured to control a charge amount of each battery using the charge information of the train.

8 Claims, 6 Drawing Sheets

(51) Int. Cl.
*B60L 1/00* (2006.01)
*B60L 7/14* (2006.01)
*B60L 11/12* (2006.01)
*B60L 11/18* (2006.01)

(52) U.S. Cl.
CPC .......... *Y02T10/7077* (2013.01); *Y02T 10/7216* (2013.01); *Y02T 10/7241* (2013.01); *Y10S 903/903* (2013.01); *Y10S 903/93* (2013.01)

(56) References Cited

U.S. PATENT DOCUMENTS

| | | | |
|---|---|---|---|
| 2005/0279242 A1* | 12/2005 | Maier et al. | 105/26.05 |
| 2006/0005736 A1* | 1/2006 | Kumar | 105/1.4 |
| 2006/0005739 A1* | 1/2006 | Kumar | 105/35 |
| 2007/0272116 A1* | 11/2007 | Bartley et al. | 105/35 |
| 2008/0270023 A1* | 10/2008 | Kumar | 701/207 |
| 2008/0288192 A1* | 11/2008 | Kumar et al. | 702/60 |
| 2009/0125170 A1* | 5/2009 | Noffsinger et al. | 701/20 |
| 2009/0293759 A1* | 12/2009 | Schmitz | 105/51 |
| 2010/0275810 A1* | 11/2010 | Barbee et al. | 105/50 |

OTHER PUBLICATIONS

Chinese Office Action dated Feb. 3, 2015, issued in counterpart Chinese Application No. 201310059478.7.

* cited by examiner

| MEASURING TIME | STATE OF CHARGE |
|---|---|
| A | 80% |
| B | 30% |
| C | 60% |
| D | 50% |
| E | 30% |
| F | 70% |

| SECONDARY BATTERY OF A FIRST LOCOMOTIVE | | SECONDARY BATTERY OF A SECOND LOCOMOTIVE | |
| --- | --- | --- | --- |
| MEASURING TIME | STATE OF CHARGE | MEASURING TIME | STATE OF CHARGE |
| G | 63% | G | 43% |
| H | 62% | H | 40% |
| I | 60% | I | 40% |
| J | 36% | J | 24% |

BATTERY CHARGING CONTROL APPARATUS OF A TRAIN

CROSS-REFERENCE TO RELATED APPLICATIONS

This application is based upon and claims the benefit of priority from prior Japanese Patent Application No. 2012-116398, filed May 22, 2012, the entire contents of which are incorporated herein by reference.

FIELD

Embodiments described herein generally relate to a battery charging control apparatus of a train.

BACKGROUND

In recent years, a railroad car equipped with a battery unit such as a secondary battery has begun to attract notice for reducing an environmental load. For example, a hybrid driving system, where a diesel engine is as power of an electric generator and the electric power is stored in a secondary battery while a motor is driven using electric power generated by the electric generator and the power of the secondary battery is used at a start or at acceleration etc., has been proposed. The secondary battery of the foregoing hybrid driving system can store not only the generated electric power, but also the electric power generated by a regenerative brake.

As the secondary battery for a rail car, a nickel hydride battery or a lithium-ion battery is often used. In these secondary batteries, an excess charge/discharge is a cause of deterioration. For this reason, it is proposed that a charge control system such as that if the secondary battery charges more than a predetermined first threshold by measuring an remained amount of the electric power stored in the secondary battery, then the charge is not executed moreover, adversely, if the remained amount is less than a second threshold, which is different from the first threshold and less than the first threshold, then the discharge is not executed moreover.

Further, it is proposed that such a control system is as that when discharge current exceeds the permissible current for the secondary battery, then output is limited, and adversely, when the charge current exceeds the permissible current for the secondary battery, changing to the other braking method such as a generative brake, a regenerative electric power charge is evaded.

As just described, in a system using the secondary battery, various proposals for restraining an excess charge/discharge are considered. In addition, a proposal such as that the secondary battery is provided with disperse in a train set which is constituted by a plurality of rail cars in which power sources are dispersed, is conventionally considered. According to the proposal, the charge/discharge of the secondary batteries can be controlled. The above mentioned technology is disclosed in Japanese Patent Application Publication No. 2011-61880, and contents of which are hereby incorporated by reference. Further, the above mentioned technology is disclosed in JR EAST Technical Review No. 34 pages 23-32, and contents of which are hereby incorporated by reference.

DETAILED DESCRIPTION

There is a locomotive as an example of an application in a hybrid driving system to a railroad car. It is often the case that the locomotive exerts traction on a passenger car or a freight car by a single car. Adversely, it is the case that the locomotive is driven by a locomotive operation in tandem where a plurality of locomotives are coupled, when a large output power is required in the case of tracking many freight cars or climbing on a steep slope.

Additionally, in recent locomotive, a overall control where the other locomotive is controlled from one car among locomotives set in tandem is executed. It is not always true that the charge status of the secondary battery in the individual locomotives in set is consistently matched at the same level. For this reason, depending on the condition of a change of a charge-discharge, there is a case that the locomotive within an acceptable range and the locomotive out of the acceptable range in regard to the status of the charge exist concurrently. In this instance, it is possible that operation in tandem including the locomotive with a status of limiting to the charge-discharge of the secondary battery is executed. In this situation, it is not enough to achieve the performance expected by a tandem coupled set Accordingly, in a conventional locomotive, a charge amount of the secondary battery provided in a plurality of train cars can not be respectively controlled. Therefore, there rises a problem that enough performance at the time of the tandem operation can not be achieved.

According to one aspect of embodiments, a charge control apparatus of a train car comprises an acquiring unit and a charge mount control unit.

A charge control apparatus of a train set having a plurality of trains, wherein the train has a generator, a battery and a motor supplied with power from the generator and the battery, power, generated by one of the generator and the motor, is able to charge to the battery, and a plurality of trains, driven by an operation of the motor, are connected and each battery is mutually independent, comprises an acquiring unit configured to acquiring charge information indicating charge condition of the battery from each train; and a charge amount control unit configured to control a charge amount of each battery using the charge information of the train.

Hereinafter, with reference to drawings, details of one embodiment of a charge control apparatus in a train car will be described. It is noted that the same component elements are included in the following aspect of a plurality of embodiments. Therefore, hereinafter a common reference symbol is given to the same component elements thereof and a duplicated description is abbreviated.

Figure 1:
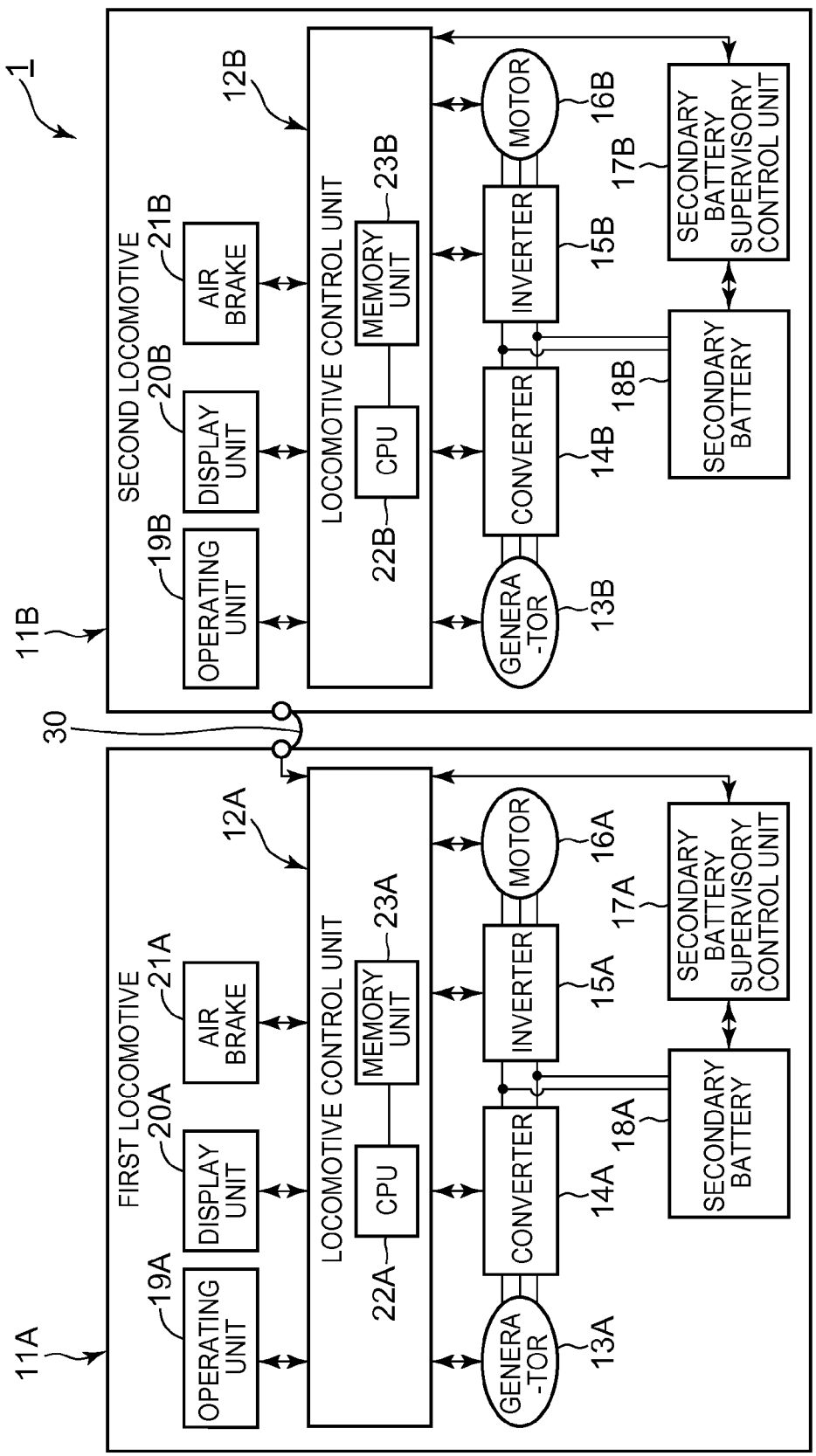
FIG. 1 shows a block diagram showing a configuration of a train set of a first embodiment.

As shown in FIG. 1, a train set 1 according to the embodiment is equipped with a first locomotive 11A and a second locomotive 11B, as a plurality of cars. The first locomotive 11A is connected with the second locomotive 11B. As well, the first locomotive 11A and the second locomotive 11B is the same configuration of the locomotive, therefore, hereinafter the configuration of the first locomotive 11A is described in detail, and the details explanation about the configuration of the second locomotive 11B is omitted.

The first locomotive 11A is equipped with a generator 13A, a converter 14A, an inverter 15A, a motor 16A as a power source, a secondary battery 18A, a second battery supervisory control unit 17A, an operating unit 19A, a display unit 20A, a air brake 21A and a locomotive control unit 12A. The first locomotive 11A is, as it is called, a hybrid driving system locomotive which is able to supply an electric power to the motor 16A from the generator 13A and the secondary battery 18A.

The generator 13A is driven by a power source (not shown) such as a diesel engine provided in the first locomotive 11A, and generates alternating current power.

The converter 14A converts alternating current power output from the generator 13A to direct current power. The inverter 15A converts direct current power output from the converter 14A to alternating current power. Additionally, the inverter 15A converts direct current power output from the secondary battery 18A to alternating current power.

The motor 16A is operated by the alternating current power output from the inverter 15A. Additionally, the motor 16A is operated by electric power supplied from the secondary battery 18A. In this manner, the motor 16A is supplied with electric power from the generator 13A and the secondary battery 18A. The motor 16A drives wheels (not shown) provided in the first locomotive 11A, thereby the first locomotive is driven. In other words, the first locomotive 11A is able to run by the operation of the motor 16A. In the motor 16A, output is able to change by changing the number of notches. As an example, by reducing the number of notches, output is able to reduce. Additionally, the motor 16A generates regenerative electric power as a generator at a regenerative brake. This regenerative electric power is supplied to the secondary battery 18A via the inverter 15A. In this case, the inverter 15A operates as a converter, and converts alternating current power generated by the motor 16A to direct current power, and supplies to the secondary battery 18A. In this way, electric power generated by the motor 16A is charged to the secondary battery 18A. Thereby the regenerative brake is operated. The regenerative brake generates a braking force which brakes the first locomotive 11A.

The secondary battery 18A stores the direct current power which is converted by the converter 14A from the alternating current power generated by the generator 13A. Additionally, the secondary battery 18A stores the regenerative electric power generated by the motor 16A. In this manner, the secondary battery 18A is able to be charged with electric power generated by the generator 13A and electric power generated by the motor 16A. In addition, the secondary battery 18A is not necessarily able to be charged with both electric power generated by the generator 13A and electric power generated by the motor 16A. The secondary battery 18A may be able to be charged with electric power generated by at least one of the generator 13A and the motor 16A. Further, the secondary battery 18A discharges (outputs) electric power to the inverter 15A. The secondary battery 18A is, for example, a nickel hydride battery or a lithium-ion battery. The secondary battery 18A is an example of a charging portion. In addition, the charging portion is not limited to the secondary battery 18A. For example, it may be the device which has a storage function such as a condenser etc. or the device such as a flywheel.

The second battery supervisory control unit 17A controls charge and discharge of the secondary battery 18A. Additionally, the second battery supervisory control unit 17A measures a current amount of charge and discharge of the secondary battery 18A and a voltage of the secondary battery 18A. Then state of charge (SOC) of the secondary battery 18A is calculated. The state of charge is a ratio of the charge amount to a full charge amount of the secondary battery 18A.

The operating unit 19A includes a master control etc. and receives an operation by a operator. In the operating unit 19A a running instruction regarding running is inputted according to the operating. The running instruction is, for example, an instruction which instructs a power running, a coasting or a decelerating (braking) etc.

The display unit 20A is, for instance, a liquid crystal display instrument, and displays various information. The display unit 20A is provided in an operating seat with the operating unit 19A.

The air brake 21A includes an air pressure mechanism, and generates a braking force of the first locomotive 11A by a frictional force. The air brake 21A is an example of other brakes. Further, other brake is not limited to the air brake 21A, for example, it may be a dynamic brake generating a braking force which arises from that the regenerated electric power generated by the motor 16A is consumed by a resister (not shown) mounted on the locomotives.

The locomotive control unit 12A monitors each section of the first locomotive 11A and controls each section of the first locomotive 11A. The locomotive control unit 12A is an example of a charge control device of a train car (charge and discharge control device). The locomotive control unit 12A has a CPU (Central Processing Unit) 22A and a memory unit 23A. The CPU 21 controls various calculations and various sections of the first locomotive 11A. The memory unit 23A has, for example, a ROM (read Only Memory) and a RAM (Random Access Memory). In the locomotive control unit 12A, the CPU 22A is operated according to a program stored in ROM. Thereby, it functions as acquiring means and charge amount control means. Further, the locomotive unit 12A is connected with the generator 13A, the converter 14A, the inverter 15A, the motor 16A, the secondary battery 18A, the secondary battery supervisory control unit 17A, the operating unit 19A, the display unit 20A and the air brake 21A. And the locomotive control unit 12A executes current control of charge and discharge to the secondary battery 18A.

The locomotive control unit 12A receives electric current of charge and discharge of the secondary battery 18A which is measured by the secondary battery supervisory control unit 17A, electric voltage of the secondary battery 18A which is measured by the secondary battery supervisory control unit 17A and charge information including state of charge of the secondary battery 18A calculated by the secondary battery supervisory control unit 17A, from the secondary battery supervisory control unit 17A, and stores the charge information in the RAM of the memory unit 22A.

Figures 2, 3:
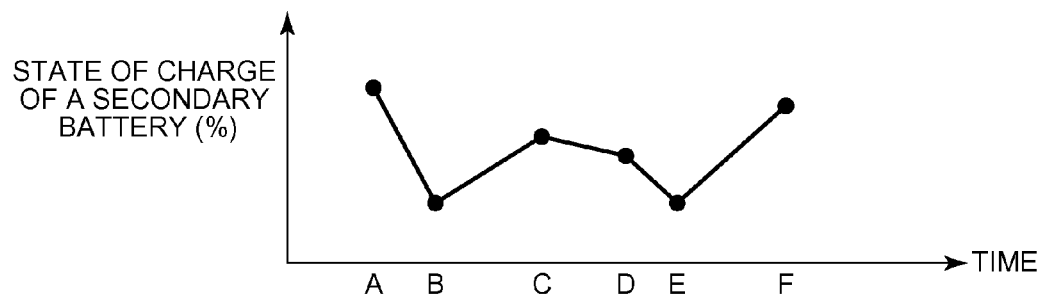
FIG. 2 shows a graph showing an example of a change of a charging rate of a secondary battery of a first embodiment.
FIG. 3 shows an explaining diagram explaining an example of a change of a charging rate of a secondary battery of a first embodiment.

In the above mentioned configuration of the first locomotive 11A, as an example, at power running, electric power is supplied to the motor 16A from at least one side of the generator 13A and the secondary battery 18A. Thereby, the motor 16A is operated and the first locomotive 11A is driven. As well, at deceleration (at braking), as an example, electric power is supplied to the secondary battery 18A from at least one side of the generator 13A and the motor 16A. Thereby, the secondary battery 18A is charged. The state of charge of the secondary battery 18A by the foregoing charge and discharge is alternated as shown in FIG. 2 and FIG. 3, as one example. The state of charge of the secondary battery 18A, as an example, is reduced for discharging at power running and increased for charging at deceleration.

Now, as described above, the suffix of the symbols attached to each part of the first locomotive 11A is "A". The suffix of the symbols attached to each part of the second locomotive 11B is "B" for the sake of convenience. More specifically, the second locomotive 11B comprises a generator 13B, a converter 14B, an inverter 15B, a motor 16B, a secondary battery 18B, a secondary battery supervisory control unit 17B, an operating unit 19B, a display unit 20B, an air brake 21B and a locomotive control unit 12B. Further, the locomotive control unit 12B comprises a CPU 22B and a memory unit 23B. In this embodiment, the secondary battery 18A of the first locomotive 11A is not mutually electrically connected with the secondary battery 18B of the second locomotive 11B, and they are mutual independent.

The locomotive control unit 12A of the first locomotive 11A is connected with the locomotive control unit 12B of the second locomotive 11B via a transmitting path 30 (a transmitting line, a crossover). In this way, transmitting and receiving information is mutually possible between the locomotive control unit 12A and the locomotive control unit 12B of the second locomotive 11B. And as an example, the locomotive control unit 12A is able to control each part of the second locomotive 11B via the locomotive control unit 12B. In other words, the first locomotive 11A can overall control the train set 1. And here, an example, where the locomotive 12a controls the train set 1 overall, is explained, however the locomotive control unit 12B may control the train set 1 overall as a matter of course. It is set by a predetermined operation toward the operation unit 19A or the operation unit 19B, whether the locomotive 12A or locomotive 12B overall controls the train set 1.

Figures 4, 5:
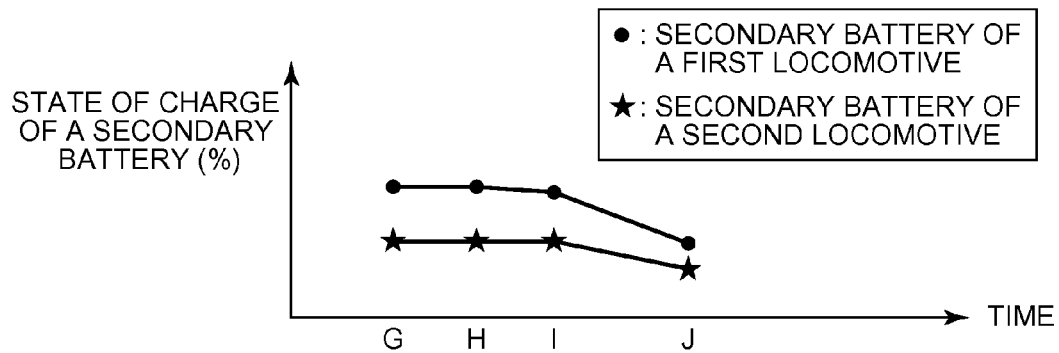
FIG. 4 shows a graph showing an example of a change of a charging rate of a secondary battery of a first embodiment.
FIG. 5 shows an explaining diagram explaining an example of a change of a charging rate of a secondary battery of a first embodiment.

Next, a charge amount control procedure executed by the locomotive control unit 12A, will be explained. As shown in FIG. 4, FIG. 5, as an example, the train set 1 stops between Time G and Time I, and executes power running between Time I and Time J and at Time I the state of charge in the secondary battery 18A is higher than the state of charge in the secondary battery 18B. Such case as mentioned above will be explained. In this case, at Time I, the difference between the state of charge in the secondary battery 18A and the state of charge in the secondary battery 18B is, as an example, 20 percent. When the state of charge among the secondary batteries 18A, 18B has difference like this, the charge amounts of the secondary batteries 18A, 18B are controlled so that the difference of the state of charge becomes smaller. By this control, as an example, at Time J, the difference between the state of charge of the secondary battery 18A and the state of charge of the secondary battery 18B becomes 12 percent. In a result, the difference of the state of charge among the secondary batteries 18A, 18B becomes smaller.

Figure 6:
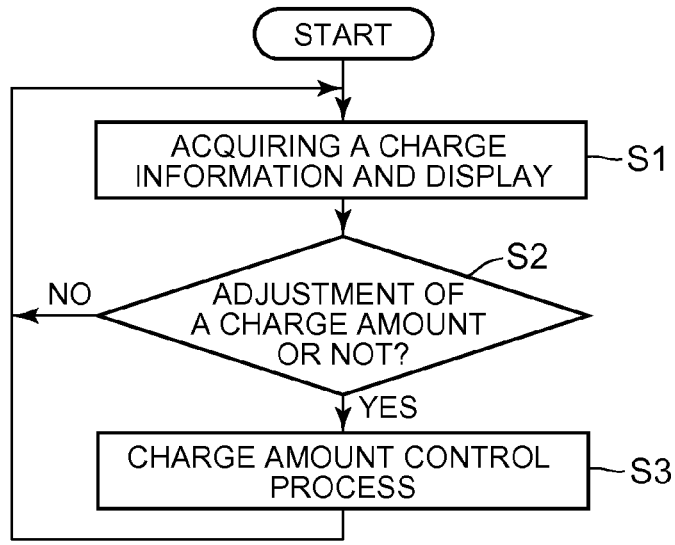
FIG. 6 shows a flowchart showing a flow of a charging amount of control process to be executed by a locomotive control unit of a first embodiment.

As described below, the charge amount control procedure will be explained in detail along a flowchart as shown in FIG. 6. Firstly, the locomotive control unit 12A acquires charge information indicating charge condition of the secondary battery 18A, 18B from each train (the first locomotive 11A, the second locomotive 11B). The acquired charge information is displayed on the display unit 20A (Step S1). Here, a function of acquiring means is executed. Acquiring the charge information, as an example, is executed periodically at a stop for operation. And when running condition is changed, it is executed at its time of the change. The time of changing running condition, for example, includes the time at a start of power running, at an end of power running, at a start of deceleration, at an end of deceleration etc. As a procedure of acquiring the charge information, the locomotive control unit 12A transmits a requiring signal, which requires transmitting the charge information of the secondary batteries 18A, 18B, to the secondary battery supervisory control unit 17A and the locomotive control unit 12B. In response to this, the secondary battery supervisory control unit 17A transmits the charge information of the secondary battery 18A to the locomotive control unit 12A. Additionally, the locomotive control unit 12B transmits a requiring signal, which requires transmitting the charge information of the secondary battery 18B, to the secondary battery supervisory control unit 17B. In response to this, the received charge information of the secondary battery 18B is transmitted to the locomotive control unit 12B. The locomotive control unit 12A stores the charge information of the secondary batteries 18A, 18B as acquired like this way in the RAM of the memory unit 23A in time-series.

Next, the locomotive control unit 12A judges whether an adjustment of the charge amount of the secondary batteries 18A, 18B is executed or not (step S2). As an example, the locomotive control unit 12A judges as the adjustment of the charge amount is executed if there is a difference in the state of charge between the secondary battery 18A and 18B at the time (power running start time) when an instruction of an start of power running is inputted (step S2: yes). On the other hand, the locomotive control unit 12A judges as an adjustment of the charge amount is not executed if there is no difference in the state of charge between the secondary battery 18A and 18B (step S2: no).

The locomotive control unit 12A executes a charge amount control processing (step S3) when it is judged that the adjustment of the charge amount is executed (step S2: yes). In charge amount control processing, using the charge information of each train (the first locomotive 11A, the second locomotive 11B), the locomotive control unit 12A controls the charge amount (charge and discharge) of each secondary battery 18A, 18B. Herein, a function of charge amount control process means is executed. In details, the locomotive control unit 12A controls at least an output of the motor 16A or 16B. Thereby, the charge amounts of the secondary battery 18A and 18B are controlled. The locomotive control unit 12A controls the charge amounts of the secondary batteries 18A, 18B so that the difference of state of charge is made to be smaller. The locomotive control unit 12A makes a notch number of the train (in this case, the secondary locomotive 11B), whose state of charge is the smallest among a plurality of trains (the first locomotive 11A, the second locomotive 11B), to be small, rather than a notch number of the train (in this case, the secondary locomotive 11A) whose state of charge is the largest among a plurality of trains (the first locomotive 11A, the second locomotive 11B). As an example, the locomotive control unit 12A sets the notch number in the first locomotive 11A as the 3rd notch and sets the notch number in the second locomotive 11B as the 2nd notch. And the motors 16A, 16B are driven. In this way, the locomotives control unit 12A sets the notch number of each train (the first locomotive 11A, the second locomotive 11B) so that the difference of the state of charge is smaller using the running instruction and the charge information.

As explained above, in this embodiment, the locomotive control unit 12A acquires the charge information indicating the charge condition of the secondary batteries 18A, 18B in the train set 1 from each train (the first locomotives 11A, the second locomotives 11B). Using the acquired charge information, the charge amount of each secondary battery 18A, 18B is controlled. Therefore, according to this embodiment, the charge amount of the secondary battery 18A, 18B which is respectively equipped with a plurality of trains (the first locomotives 11A, the second locomotives 11B) can be individually controlled. Thus, according to this embodiment, a performance expected by the trains in tandem of the first locomotives 11A and the second locomotives 11B is enough enhanced.

Furthermore, in this embodiment, the locomotive control unit 12A controls the charge amounts of the secondary batteries 18A, 18B so that the difference of the state of charge in the secondary batteries 18A, 18B is smaller. Therefore, as an example, the discharge amount of one, whose state of charge is less among the secondary batteries 18A, 18B, can be reduced, compared to the discharge amount of one, whose state of charge is larger. Thus, reduction of the charge amount of one (for example, the secondary battery 18B), whose state of charge is smaller among the secondary batteries 18A, 18B, can be restrained. In this instance, the discharge amount of one (the secondary battery 18A), whose charge of status is larger among the secondary batteries 18A, 18B, is increased. However, instead of this, the output of the motor 16A, which is supplied with electric power from the relevant secondary battery 18A, is larger. Therefore, the first locomotive 11A makes up for the amount to which the output of the second locomotive 11B is restrained. Thereby, it can be operated with keeping the whole output of the train set 1 (in tandem). Additionally, by the forgoing control, according to this embodiment, it can be evaded that the state of charge of the secondary batteries 18A, 18B stays in the range (for example, an upper limit or a lower limit of the state of charge), which becomes a big burden toward an operating life of the battery. Therefore, a deterioration of the secondary batteries 18A, 18B can be restrained and a burden of replacing the battery can be reduced.

Next a first modification of the embodiment will be explained. In this modified embodiment, in step S1 of the charge amount control processing, the locomotive control unit 12A acquires the information using the acquired charge information of the secondary batteries 18A, 18B. And the information using the relevant charge information is displayed in the display units 20A, 20B. Herein, the function of means for displaying information is executed. The information regarding running of the train set 1, as an example, is the residual expected time which is able to run at some point in time.

Figure 7:
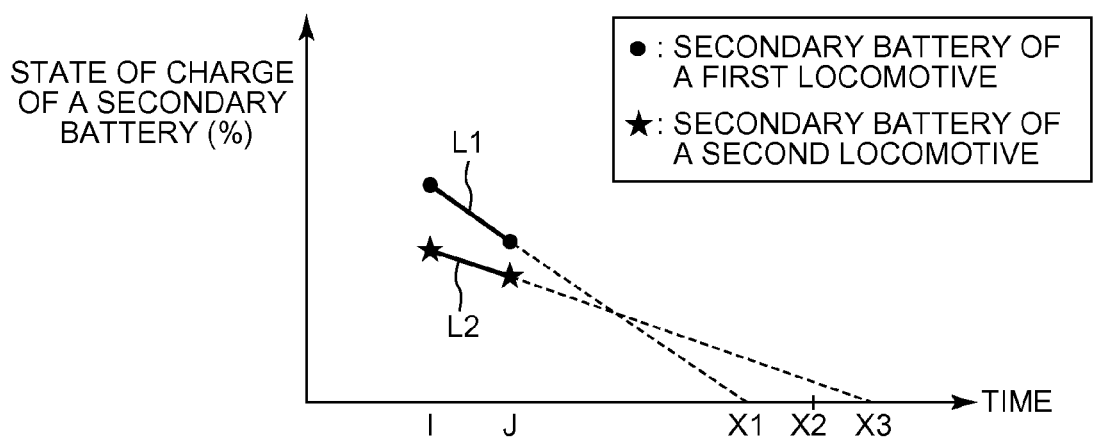
FIG. 7 shows a graph showing an example of a change of a charging rate of a secondary battery of a modified embodiment regarding a first embodiment.

An example of a calculating method of the expected time which is able to run, executed by the locomotive control unit 12A will be explained with reference to FIG. 7. This calculation is executed at power running. A line which goes through the state of charges of the secondary battery 18A on two time points (as an example, Time I, J) at power running is L1, and a line which goes through the state of charges of the secondary battery 18B on two time points (as an example, Time I, J) at power running is L2. In addition, Time J is at the time point when this calculation is executed. And Time X2, between the expected Time X1 when the state of charge of the secondary battery 18A becomes "0" according to the line L1 and the expected Time X3 when the state of charge of the secondary battery 18B becomes "0" according to the line L2, is acquired. The difference between the Time X2 and the Time J becomes the residual expected time which is able to run. Further, as the information using the charge information, the expected Time X1 when the state of charge of the secondary battery 18A becomes "0" according to the line L1 and the expected Time X3 when the state of charge of the secondary battery 18B becomes "0" according to the line L2 may be displayed.

As mentioned above, in this embodiment, the locomotive control unit 12A displays the residual expected time which is able to run on the display unit 20A. Thus, an operator can drive while the residual expected time which is able to run is figured out.

Next, a second modified embodiment of this embodiment will be explained. In this modified embodiment, at step S2 of the charge amount control processing, when the difference (hereinafter it may be referred to as a state of charge difference) between the state of charge of the train (for example, the first locomotive 11A) where the state of charge is the largest among a plurality of trains (the first locomotive 11A, the second locomotive 11B) and the state of charge of the train (for example, the second locomotives 11B) where the state of charge is the smallest among a plurality of trains (the first locomotive 11A, the second locomotive 11B), is more than or equal to a first threshold, the locomotive control unit 12A judges that an adjustment of the charge amount is executed (step S2: yes). On the other hand, when the difference between the state of charge of the train (for example, the first locomotive 11A) where the state of charge is the largest among a plurality of trains (the first locomotive 11A, the second locomotive 11B) and the state of charge of the train (for example, the second locomotive 11B) where the state of charge is the smallest among a plurality of trains (the first locomotive 11A, the second locomotive 11B), is not more than or equal to the first threshold, the locomotive control unit 12A judges that an adjustment of the charge amount is not executed (step S2: no). Herein, the first threshold is, as an example, 10 percent.

And in step S3, the locomotive control unit 12A makes a difference between the notch number of the train (in this case, the first locomotive 11A) where the state of charge is the largest and the notch number of the train (in this case, the second locomotive 11B) where the state of charge is the smallest. As an example, when the state of charge difference is more than or equal to the first threshold and less than the second threshold, the locomotive control unit 12A makes the difference by "one" as a first difference between the notch number of the train (in this case, the first locomotive 11A) where the state of charge is the largest and the notch number of the train (in this case, the second locomotives 11B) where the state of charge is the smallest. Here, the second threshold is larger than the first threshold, as an example, 50 percent. In addition, when the state of charge difference is more than or equal to the second threshold, the locomotive control unit 12A makes the difference by "two" as a second difference between the notch number of the train (in this case, the first locomotive 11A), where the state of charge is the largest and the notch number of the train (in this case, the second locomotives 11B), where the state of charge is the smallest.

Next, the third modified embodiment of this embodiment will be explained. The locomotive control unit 12A executes to charge the secondary battery (for example, the secondary battery 18B) whose the state of charge is the smallest among the secondary batteries 18A, 18B of a plurality of the trains (the first locomotive 11A, the second locomotive 11B) during a run of the train set 1. In details, the generated electric power of the generator 13B is supplied to the secondary battery 18B and the discharge from the secondary battery 18A to the generator 16B is not executed. In this case, the locomotive control unit 12A makes the generator 16A of the train (for example, the first locomotives 11A), where the state of charge is the largest among the secondary batteries 18A, 18B of a plurality of the trains (the first locomotive 11A, the second locomotive 11B), operate as power of the train set 1. Concretely, as an example, in step S3 of the charge amount control processing, in the case where the outputs (notch number) of the generators 16A, 16B are set and in the case where the output of one side of the first locomotive 11A or the second locomotives 11B is set to be "0", the locomotive control unit 12A charges the secondary battery 18A (or 18B) of the train (the first locomotive 11A or the second locomotive 11B) where the output is set as "0".

Next, the forth modified embodiment of this embodiment will be explained. In this modified embodiment, in step S2 of charge amount control processing, during running of the train set 1, when each train (the first locomotive 11A, the second locomotive 11B) operates the regenerative brake and in the case where one secondary battery 18A or 18B reaches the prescribed state of charge, the locomotive control unit 12A operates the air brakes 21A, 21B of each train (the first locomotive 11A, the second locomotive 11B). Also, it may be changed to a dynamic braking in the case where a resister used for the dynamic braking is mounted. Further, the prescribed state of charge is the state of charge which is less than the highest value in the range of the state of charge where the regenerative brake is operated. In other words, the prescribed state of charge is the state of charge which is less than the upper limit of the charge acceptable range of the secondary batteries 18A, 18B. The stop of the regenerative brake is made by the operation of the secondary battery supervisory control unit 17A, 17B. Herein, in the case where each air brake 21A, 21B is individually controllable, the only air brake 21A or 21B of the train, where the secondary battery 18A or 18B reaches the prescribed state of charge, may be operated. In short, when the regenerative brake of one train (the first locomotive 11A or the second locomotive 11B) is operated, and in the case where the secondary battery 18A (or 18B) of the relevant train reaches the prescribed state of charge, the locomotive control unit 12A operates the air brake 21A (or 21B) of the train (the first locomotive 11A, the second locomotive 11B) where the secondary battery 18A (or 18B) reaches the prescribed state of charge.

Herein, compared to the regenerative brake, in the air brake 21A, 21B, it takes time from the time when an instruction of a start operation is issued from the locomotive control unit 12A, 12B to the time when braking force is actually generated. Accordingly, after the regenerative brake is expired, the locomotive control unit 12A, 12B issues the instruction of the start operation of the air brake 21A, 21B, and then the braking can not be smoothly executed. In contrast to this, in this embodiment, when the regenerative brake is operated in each train (the first locomotive 11A, the second locomotive 11b) and in the case where one secondary battery 18A or 18B reaches the prescribed state of charge, the locomotive control unit 12A operates the air brake 21A, 21B of each train (the first locomotive 11A, the second locomotive 11B). Accordingly, before the regenerative brake is expired, the air brake 21A, 21B can be operated. Therefore, the braking of the train set 1 can be smoothly executed. As well, like this way, by operating the air brake 21A, 21B before the regenerative brake is expired, braking function of each train (the first locomotive 11A, the second locomotive 11B) can be uniformly. And a transition from the regenerative brake to the air brake 21A, 21B can be smoothly executed and a fluctuation of the braking force can be suppressed.

Next, the fifth modification of the embodiment will be explained. In this embodiment, at a brake of the train set 1, in the train equipped with the secondary battery 18A (or 18B) whose state of charge is the largest among a plurality of secondary batteries 18A, 18B, the locomotive control unit 12A does not operate the regenerative brake and operates the air brake 21A (or 21B).

Figure 8:
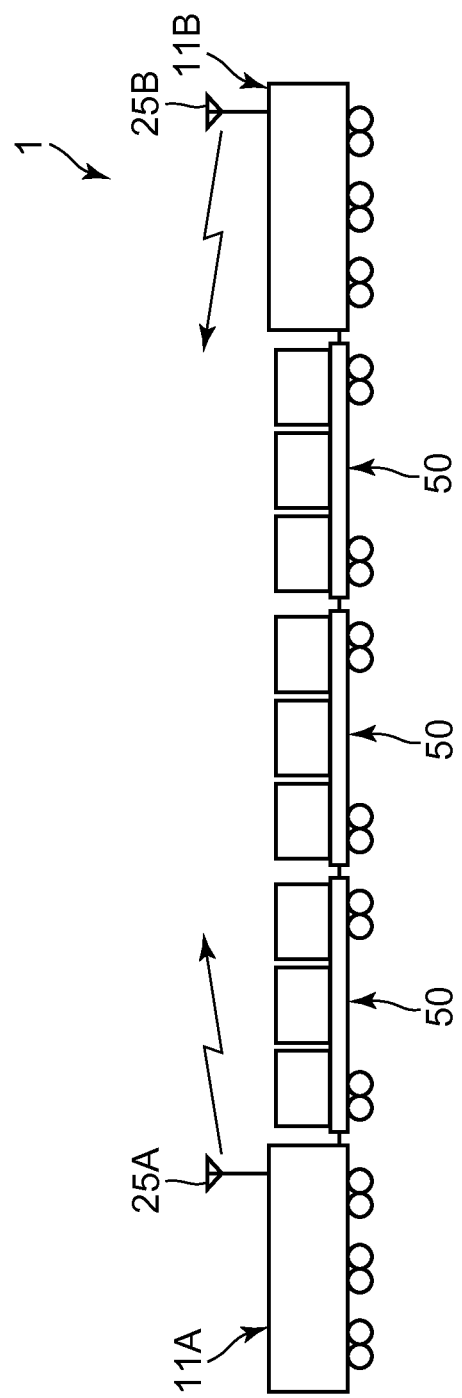
FIG. 8 shows a configuration of a train set of a second embodiment.

Next, a second embodiment will be explained. As shown in FIG. 8, the train set 1 of this embodiment is provided with an intermediate train 50. The intermediate train 50 is disposed between the first locomotive 11A and the second locomotive 11B. The first locomotive 11A is connected with the second locomotive 11B via the intermediate train 50. The intermediate train 50 has no power source.

Figure 9:
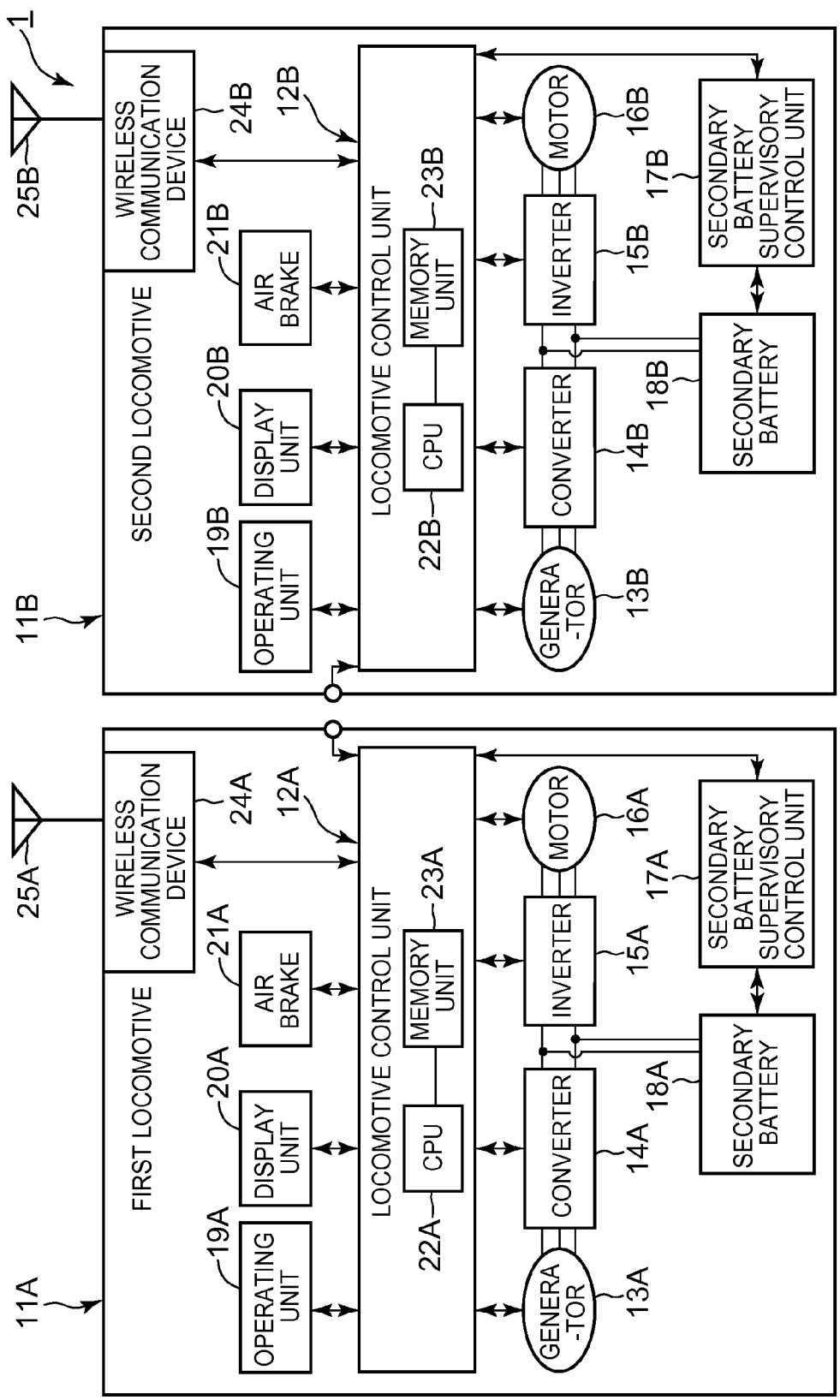
FIG. 9 shows a block diagram showing a configuration of a first and a second locomotive of a second embodiment.

As shown in FIG. 9, the first locomotive 11A is provided with a wireless communication device 24A and the second locomotive 11B is provided with a wireless communication device 24B. The wireless communication devices 24A, 24B are provided with an antenna 25A, 25B. The wireless communication devices 24A, 24B are able to communicate each other. In this embodiment, the communication between the locomotive control unit 12A and the locomotive control unit 12B is executed via the wireless communication device 24A, 24B.

In this embodiment, as well as the first embodiment, the charge amount of the secondary battery 18A, 18B, which is respectively equipped with a plurality of trains (the first locomotive 11A, the second locomotive 11B), can be individually controlled.

As mentioned above, according to each embodiment or each modified embodiment, the charge amount of the secondary battery 18A, 18B, which is respectively equipped with a plurality of trains (the first locomotive 11A, the second locomotive 11B), can be individually controlled.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form of the methods and systems described herein may be made without departing from the sprit of the inventions. The accompanying claims and their equivalents are intended to cover such forms or modifications as would fall within the scope and spirit of the inventions.

What is claimed is:

1. A charge control apparatus for a train set including a plurality of locomotives, wherein each locomotive includes a generator, a battery, and a motor supplied with power from the generator and the battery, and in each of the locomotives power generated by at least one of the generator and the motor is utilized to charge the battery, and wherein the plurality of locomotives are connected and the batteries of the locomotives are mutually independent, said charge control apparatus comprising:

an acquiring unit configured to acquire charge information indicating a charge condition of the battery from each locomotive; and a charge amount control unit configured to control a charge amount of each battery using the charge information;

wherein the charge information includes a state of charge of the battery, and when there is a difference between the states of charge of the batteries, the charge amount control unit control controls the charge amount of each battery to reduce the difference between the states of charge of the batteries;

wherein the charge amount control unit operates the motor of one of the locomotives, as power of the train set, having a largest state of charge among the batteries of the plurality of the locomotives, during running of the train set; and wherein the charge amount control unit charges the battery of one of the locomotives having a smallest state of charge among the batteries of the plurality of the locomotives.

2. A charge control apparatus for a train set including a plurality of locomotives, wherein each locomotive includes a generator, a battery, and a motor supplied with power from the generator and the battery, and in each of the locomotives power generated by at least one of the generator and the motor is utilized to charge the battery, and wherein the plurality of locomotives are connected and the batteries of the locomotives are mutually independent, said charge control apparatus comprising:

an acquiring unit configured to acquire charge information indicating a charge condition of the battery from each locomotive; and a charge amount control unit configured to control a charge amount of each battery using the charge information;

wherein the charge information includes a state of charge of the battery;

wherein each of the locomotives includes a regenerative brake which generates a braking force by supplying a regenerative electric power to the battery by the motor, and another brake that is different from the regenerative brake; and wherein when the regenerative brake is operated at one of the locomotives, and the battery of the one of the locomotives reaches a prescribed state of charge which is less than a highest value in a range of state of charge where the regenerative brake operates, the charge amount control unit operates the another brake of the one of the locomotives whose battery reaches the prescribed state of charge.

3. The charge control apparatus of a train set according to claim 2, wherein when the regenerative brake is operated for each of the locomotives, and the battery of any of the locomotives reaches the prescribed state of charge, the charge amount control unit operates the another brake of each of the locomotives.

4. A charge control apparatus for a train set including a plurality of locomotives, wherein each locomotive includes a generator, a battery, and a motor supplied with power from the generator and the battery, and in each of the locomotives power generated by at least one of the generator and the motor is utilized to charge the battery, and wherein the plurality of locomotives are connected and the batteries of the locomotives are mutually independent, said charge control apparatus comprising:

an acquiring unit configured to acquire charge information indicating a charge condition of the battery from each locomotive; and a charge amount control unit configured to control a charge amount of each battery using the charge information;

wherein the charge information includes a state of charge of the battery;

wherein each of the locomotives includes a regenerative brake which generates a braking force by supplying a regenerative electric power to the battery by the motor, and another brake that is different from the regenerative brake; and wherein the charge amount control unit does not operate the regenerative brake and operates the another brake of one of the locomotives having the battery with a largest state of charge among the batteries of the locomotives, at braking of the train set.

5. A charge control method for a train set including a plurality of locomotives, wherein each locomotive includes a generator, a battery, and a motor supplied with power from the generator and the battery, and in each of the locomotives power generated by at least one of the generator and the motor is utilized to charge the battery, and wherein the plurality of locomotives are connected and the batteries of the locomotives are mutually independent, said method comprising:

acquiring charge information of the battery from each locomotive; and controlling a charge amount of each battery using the charge information;

wherein the charge information includes a state of charge of the battery, and the controlling of the charge amount comprises, when there is a difference between the states of charge of the batteries, controlling the charge amount of each battery to reduce the difference between the states of charge of the batteries;

wherein the controlling of the charge amount comprises operating the motor of one of the locomotives, as power of the train set, having a largest state of charge among the batteries of the plurality of the locomotives, and charging the battery of one of the locomotives having a smallest state of charge among the batteries of the plurality of the locomotives.

6. A charge control method for a train set including a plurality of locomotives, wherein each locomotive includes a battery and a motor supplied with power from the battery, and in each of the locomotives power generated by the motor is utilized to charge the battery, and wherein the plurality of locomotives are connected and the batteries of the locomotives are mutually independent, said method comprising:

acquiring charge information of the battery from each locomotive; and controlling a charge amount of each battery using the charge information;

wherein the charge information includes a state of charge of the battery, wherein each of the locomotives includes a regenerative brake which generates a braking force by supplying a regenerative electric power to the battery by the motor, and another brake that is different from the regenerative brake; and wherein the controlling of the charge amount comprises, when the regenerative brake is operated at one of the locomotives, and the battery of the one of the locomotives reaches a prescribed state of charge, operating the another brake of the one of the locomotives whose battery reaches the prescribed state of charge.

7. The charge control method according to claim 6, wherein when the regenerative brake is operated for each of the locomotives, and the battery of any of the locomotives reaches the prescribed state of charge, the controlling of the charge amount comprises operating the another brake of each of the locomotives.

8. A charge control method for a train set including a plurality of locomotives, wherein each locomotive includes a battery and a motor supplied with power from the battery, and in each of the locomotives power generated by the motor is utilized to charge the battery, and wherein the plurality of locomotives are connected and the batteries of the locomotives are mutually independent, said method comprising:

acquiring charge information of the battery from each locomotive; and controlling a charge amount of each battery using the charge information;

wherein the charge information includes a state of charge of the battery, wherein each of the locomotives includes a regenerative brake which generates a braking force by supplying a regenerative electric power to the battery by the motor, and another brake that is different from the regenerative brake; and wherein the controlling of the charge amount comprises operating the another brake, and not the regenerative brake, of one of the locomotives having the battery with a largest state of charge among the batteries of the locomotives, at braking of the train set.

* * * * *